Jan. 21, 1936. R. HEINEMANN 2,028,664
VEHICLE DIRECTION INDICATOR
Original Filed Nov. 20, 1930
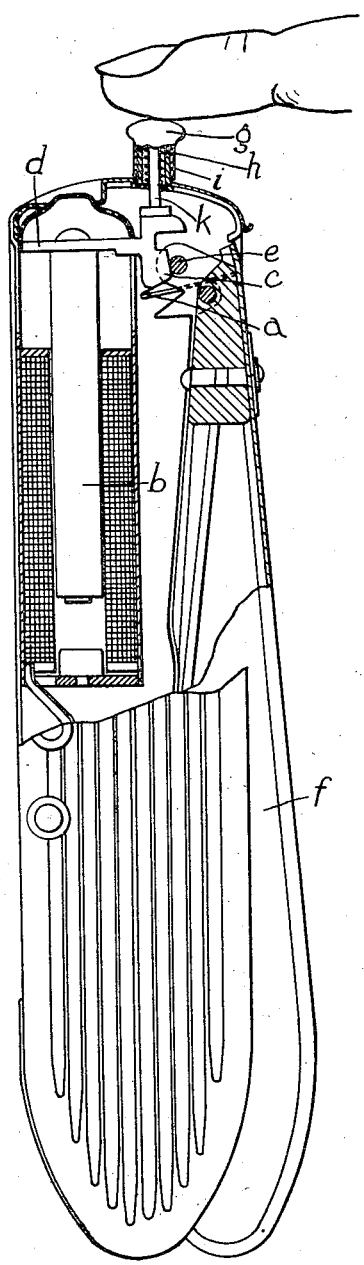
INVENTOR
R. HEINEMANN
BY
Sydney R. Page.
ATTORNEY Patented Jan. 21, 1936

2,028,664

UNITED STATES PATENT OFFICE 2,028,664

VEHICLE DIRECTION INDICATOR

Rudolf Heinemann, Berlin, Germany

Original application November 20, 1930, Serial No. 496,966. Divided and this application August 13, 1934, Serial No. 739,673. In Germany January 27, 1930

2 Claims. (Cl. 177—329)

This application is a division of my co-pending application, Serial No. 496,966, filed November 20, 1930.

Electro-magnetic direction indicators, particularly for motor vehicles or the like, are known in which an indicating arm is so locked in the normal position that vibration to which the arm is subjected by the vehicle does not cause it to swing out of the housing. Such devices have the advantage that the arm only moves out of the housing when it is definitely operated in order to indicate the change in the direction of travel, but on the other hand they have the disadvantage that without the operation of the electro-magnet, e. g. on a failure of the electric current or the like, it is difficult to raise the indicator arm manually. The majority of users attempt to force the indicator arm into the raised position in order to reach the electro-magnet which in the normal is covered by the indicator. This frequently results in damage and it is usually necessary to remove the indicator from the vehicle, and by forcibly shaking it to cause the indicator arm to swing out, that is to say, to allow the magnets to drop.

It is the object of the present invention to provide an improved form of indicator wherein the locking means which retain the indicating arm in the housing against movement due to vibration may be released by hand, as well as by the electro-magnet, so that in case of failure of the latter, the indicating arm may be manually raised or swung out of the housing.

Conveniently a locking member may be provided on the armature of the magnet and may be adapted to engage with a stop on the movable part of the indicator, and means may be provided for withdrawing the locking member from the stop prior to or during actuation of the indicator.

The features of the invention will be further described with reference to the accompanying drawing in which the figure shows an indicator according to the invention, partly in section, having a press button for releasing the lock.

In the figure the electrical actuating system for the indicating arm comprises the core $b$ extending within a solenoid coil and having a head plate $d$ on which is formed an actuating member $o$ and a locking member in the form of an abutment $c$. On the indicator arm $f$ is a stop pin $e$ adapted to co-operate with this locking member. The indicating arm $f$ is maintained in its position of rest by the pin $e$ resting against the member $c$. A leaf spring $a$ serves to cushion the signal arm when it falls from the signalling position.

According to the construction shown, a press button $g$ is provided on the top of the housing, which is guided in a casing $h$ and is biased upwardly by a helical spring $i$. From the press button a rod $k$ extends downwards, of which the lower end acts on the locking member $c$, in such a way that when the press button is depressed the locking member $c$, when no electric current passes through the coil, is so far depressed that the stop on the signal arm $f$ comes out of engagement with the locking member $c$.

It will thus be seen that the present invention presents very simple means for releasing the lock on the indicator arm so as to permit the latter to be manually raised, for example, in the case of a failure in the electrical system.

What I claim is:—

1. In a direction indicator the combination of a casing, an indicating arm pivoted at the upper end of the casing, a solenoid disposed within the casing and having a core with respect to which the indicating arm is normally parallel, a head plate on the core, an abutment formed integral with the head plate, a pin connected to the arm, said pin being arranged above and towards the solenoid side of the pivot of the arm, said pin normally bearing against the abutment in a direction substantially at right angles to the axis of the solenoid to retain the arm within the casing, an actuating member formed integral with the head plate and normally spaced away from the pin, whereby initial movement of the solenoid moves the abutment clear of the pin and releases the arm while further movement of the armature causes the actuating member to engage and move the pin and consequently swing the arm out of the casing, a spring adapted to cushion the arm when it returns to the normal position, and means externally of the casing so as first to move the abutment into a non-retaining position and then to allow the arm to be swung outwardly independently of energization of the solenoid.

2. In a direction indicator the combination of a casing, an indicating arm pivoted at the upper end of the casing, a solenoid disposed within the casing and having a core with respect to which the indicating arm is normally parallel, a head plate secured to said core, an abutment formed integrally with said head plate, a pin secured to the arm, said pin normally bearing against said abutment in a direction substantially at right angles to the axis of the solenoid whereby the arm is normally retained against movement due to vibration, an actuating member formed integrally with said head plate, said actuating member being normally spaced from said pin, releasing means mounted on said casing, and adapted to move the said abutment clear of said pin, whereupon the arm can be gripped by hand and swung out of the casing without independent energization of the solenoid, means to return said releasing means to its normal inoperative position, and a spring adapted to cushion the return of the arm into its normal position.

RUDOLF HEINEMANN.